Patented June 19, 1934

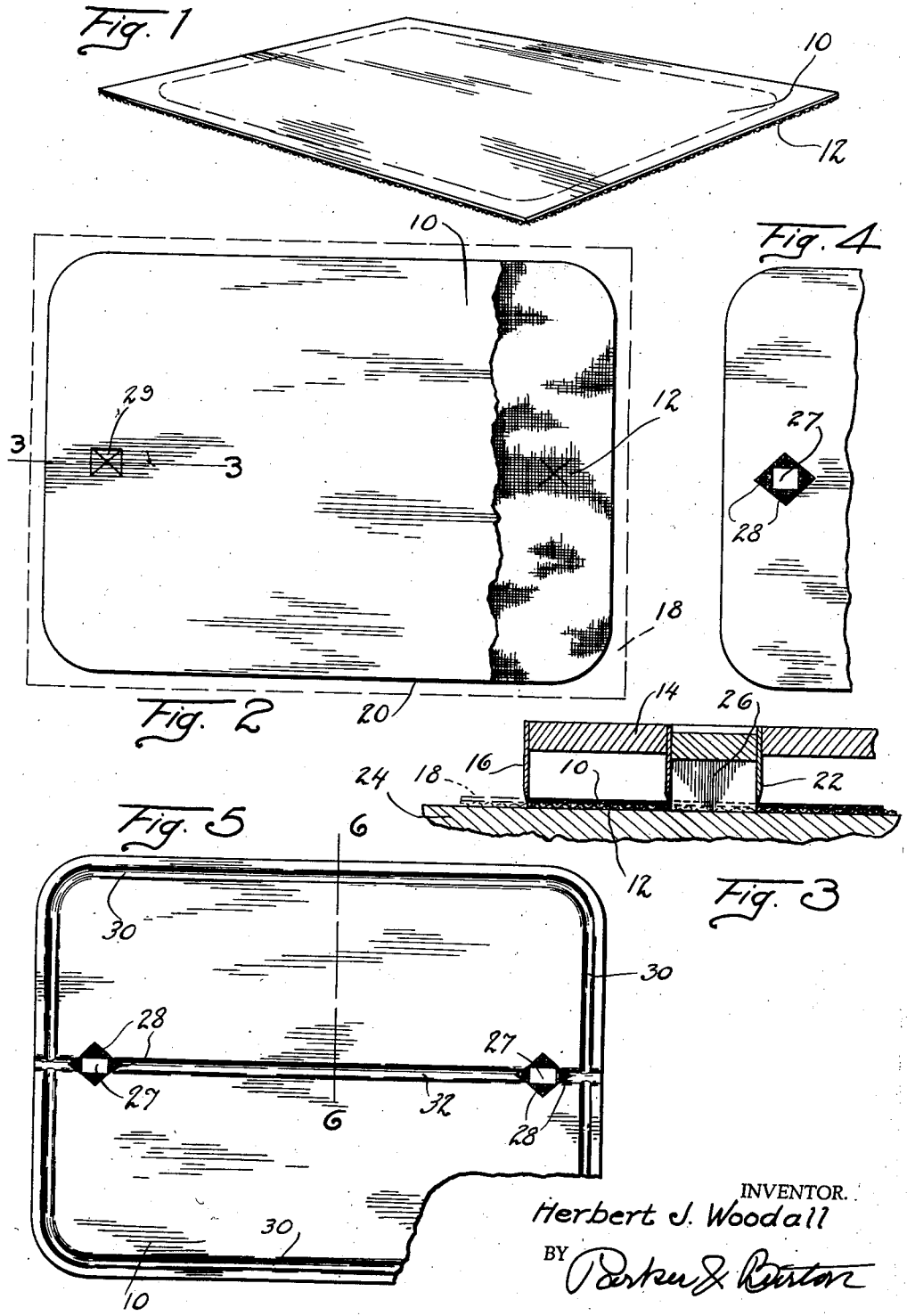

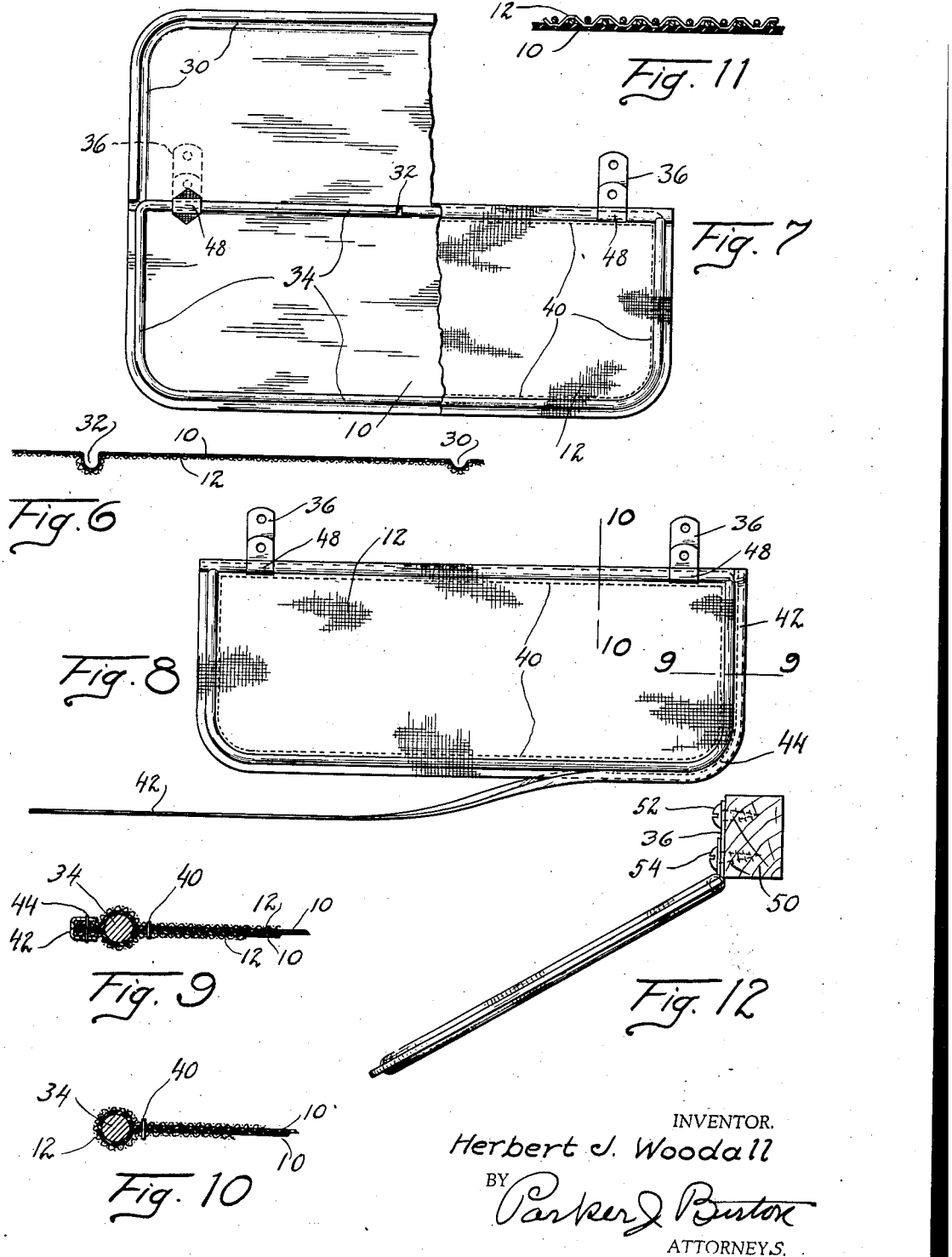

1,963,393

UNITED STATES PATENT OFFICE 1,963,393

LAMINATED PANEL

Herbert J. Woodall, Detroit, Mich., assignor to Woodall Industries, Incorporated, Detroit, Mich., a corporation of Michigan Application June 13, 1932, Serial No. 616,788

12 Claims. (Cl. 154—2)

This invention relates to laminated panels and a process of making the same, emphasis for the purpose of disclosure being placed on a product illustrated in the drawings and formed of such laminated material.

An object of the invention is to provide a laminated panel including a rigidifying frame disposed interiorly of the panel and having an exterior fabric covering the entire outer surface of such panel. An important feature of the invention resides in the process utilized in forming the laminated panel about a rigidifying frame, said frame being positioned between the laminations around the marginal portion of the panel and secured in place thereby. In carrying out this phase of the invention a single flat base sheet is grooved to form duplicate opposed units, one of which is folded over the other after positioning the frame in the seat delineated by the groove.

A further object of the invention is to produce such a panel at minimum cost and with relatively few simple operations. In practice it has been found preferable to utilize as a foundation for the completed laminated structure thermoplastic material which may be readily deformed under heat and pressure and upon which a fabric covering may be applied in such manner that the fibers of the fabric are partially embedded or sealed in the thermoplastic material. In this way the wearing qualities of the fabric covering are substantially improved and a relatively inexpensive fabric may be utilized.

Various other objects and meritorious features of the invention reside in the particular manner in which the structure is processed during the formation of the completed panel and in the completed panel itself.

For purposes of illustration a panel primarily adapted for use as a sun visor to protect automobile drivers from glare has been depicted in the drawings, means being associated with a panel for supporting it upon a cross frame member of the vehicle body, said means being engaged frictionally with the rigidifying frame of the panel so that the panel will remain fixed in any position to which it is adjusted when swung about its pivotal support.

The manufacture of the base sheets along, with or without a fabric covering, to be stacked and shipped for completion at the point of installation, is contemplated in the present invention. For that reason the pre-grooved base sheet as an article of manufacture represents an important feature of the invention.

Referring now to the drawings, Fig. 1 represents the uncut sheet from which the finished panel is to be formed.

Fig. 2 is a bottom plan view of the fabric covered base unit cut out of the sheet of Fig. 1, Fig. 3 is a sectional elevation illustrating one manner in which the base sheet of Fig. 2 may be cut out, Fig. 4 is a plan view, broken away, of the base sheet after being cut in the manner illustrated in Fig. 3, Fig. 5 is a plan view of the underside of the base sheet after the next operation has been performed thereon, Fig. 6 is a section along line 6—6 of Fig. 5, Fig. 7 is a plan view, partly broken away, illustrating the manner in which the rigidifying frame is positioned in the panel, Fig. 8 illustrates the panel finished with the exception of the binding strip extending around the outer edge thereof, Fig. 9 is a section through line 9—9 of Fig. 8, Fig. 10 is a section through line 10—10 of Fig. 8, Fig. 11 illustrates the manner in which the fibers of the fabric covering are partially embedded in the thermoplastic material, and Fig. 12 is a side elevation of the finished panel in operative position.

As hitherto stated, the laminated panel is preferably formed of a sheet of thermoplastic material 10 upon one surface of which a fabric covering 12 is positioned by suitable adhesive. For reasons to be brought out more clearly hereinafter a very inexpensive type of trim fabric may be utilized. The base unit illustrated in Fig. 1 having been formed in any suitable manner, it is placed in a cutting die which produces the structure illustrated in Figs. 2 and 4.

One manner of performing this cutting operation is clearly illustrated in Fig. 3, although it is immaterial in so far as the invention is concerned how the particular structure derived by the cutting operation is produced. For purposes of illustration, Fig. 3 discloses a supporting member 14 to which is secured a cutting knife 16 operable to cut off the outer marginal portion 18 of the rough sheet illustrated in Fig. 1 to produce the substantially rectangular sheet 20, having rounded corners, illustrated in Fig. 3. This outside cutting knife 16 cuts through both the fabric covering 12 and the thermoplastic sheet 10.

The supporting member 14 also carries a substantially square knife die 22 which is operable to cut through only the thermoplastic sheet 10, as illustrated in Fig. 3, also placed uppermost on the supporting block 24 during the cutting operation. This die produces the aperture 27 in the thermoplastic sheet. A cross shaped follow up die 26 may be operated simultaneously with or subsequent to the other cutting knives to sever both the thermoplastic sheet and the fabric covering along the lines indicated in Fig. 2, thereby forming four triangular pieces 29 of thermoplastic material to be removed after this step in the process and providing the fabric flap portions 28 which are folded back over the thermoplastic sheet as clearly indicated in Fig. 4 and secured thereto.

As will be apparent from Figs. 2 and 3, a pair of such openings 26 and 28 are provided along the longitudinal center line of the base sheet at spaced intervals. The base sheet is next subjected to an embossing die which operates to form a groove 30 around the margin of said sheet slightly spaced from the edge thereof. This groove is provided on the uncovered side of the composite sheet, the said sheet being placed on the die with the thermoplastic sheet uppermost The force member cooperating with the die to form this marginal groove includes a force portion adapted to form a transverse groove 32 extending clear across the longitudinal axis of the sheet. This groove is of a deeper draw than the marginal groove 30.

As a result of the grooving or embossing operation the fabric covering 12 will be partially embedded in the thermoplastic sheet 10 as clearly indicated in Fig. 11, and by reason thereof the wearing qualities of any given fabric are substantially improved. This permits the utilization of fabric less costly than might otherwise be necessitated to produce an attractive and durable article.

The next operation is the positioning of a rigidifying frame. The rigidifying frame 34 delineates any contour which is desired in the finished article. In this instance the frame comprises a substantially rectangular element which may be composed of wire or any substance having sufficient rigidity for the desired purpose, and is adapted to fit in the grooves provided in the panel. A metallic rod of given length may be readily bent into the desired frame structure as illustrated in the drawings, the ends of the rod being slightly spaced as clearly indicated in Fig. 7. The inherent resiliency of such material will tension the fiber board covering of the frame as the latter is secured thereover and tend to maintain such covering in a taut condition. An important feature in the formation of the finished product is the production of a grooved seat, such as is disclosed in Fig. 5, wherein the grooves delineate the desired contour of the finished product in what may be regarded as double opposed relationship, one portion of such contour being common to the two double sections.

Preferably the supporting brackets 36 are positioned about the frame as indicated in Fig. 7 prior to seating the frame in the groove. The spaced apertures or openings provided in the base sheet by the die cutting operation permit the brackets to extend up through the sheet, the exposed segments of fabric 38 (Fig. 5) being folded over the thermoplastic side of the composite sheet and secured there in any desired fashion.

The opposed side of the base sheet is then folded over as indicated in Fig. 8 in sandwich fashion and the two layers are stitched together as indicated at 40 along a line just inside the rigidifying frame, thus securing the two component edges of the finished panel. A binding 42 is then stitched around the outer edges of the two layers as indicated at 44, making a double line of stitching in conjunction with the stitching 40 to secure the two layers firmly together and to position the outer binding. The deeper draw groove 32 forms a seat for the base portion of the rectangular frame Brackets 36 are preferably U-shaped structures having a sleeve portion 48 in the base thereof adapted to receive the rigidifying frame. The arms of the U are of different lengths and the bracket is secured to any desired supporting frame 50 by means of screws 52 and 54. It will be apparent from Fig. 12 that the screw 54 extends through both of the arms and functions to tighten the sleeve portion 48 of the bracket about the frame 34, thereby insuring a sufficient frictional contact between the elements to fixedly position the panel in any position to which it may be swung.

What I claim:

1. In the formation of a fiber board panel having a rigidifying frame conforming substantially to the contour of the desired panel, the steps of grooving a sheet of such board along a line delineating the desired contour in duplicate opposed relationship, a portion of such contour being common to the two duplicate sections, positioning the frame in one of the grooved contours, and folding the duplicate section over the frame so positioned along the grooved portion common to both sections.

2. In the formation of a fiber board panel having a rigidifying frame conforming substantially to the contour of the desired panel, the steps of grooving a sheet of such board along a line delineating the desired contour in duplicate opposed relationship, a portion of such contour being common to the two duplicate sections and of a deeper draw than the remainder of the grooved contours, positioning the frame in one of the grooved contours, folding the duplicate section over the frame so positioned along the grooved portion common to both sections, and securing the free edges of the superposed sections together.

3. An article of manufacture comprising a fiber board blank, and grooves on one face of said blank delineating duplicate opposed geometrical contours having a portion of such contours in common, the groove representing said common portion being of deeper draw than the other grooved portions.

4. An article of manufacture comprising a substantially rectangular panel of fibrous thermoplastic material having a marginal groove formed in one face and a transverse groove of deeper draw extending across the center of said face from one end to the other, covering material secured over the opposite face of the panel, said panel provided with two substantially rectangular apertures formed in said transverse groove, one adjacent each end thereof, said covering material being severed diagonally across each aperture between opposite corners and having the ends formed by said lines of severance folded through the apertures and secured to the opposite face of the panel.

5. A visor panel comprising a double thickness of thermoplastic fibrous material, said two thicknesses being formed from a single sheet of material folded upon itself along the line of a relatively deep groove extending transversely of the sheet, said two thicknesses provided with complementary marginal grooves along three edges formed upon the juxtaposed faces of the thicknesses and being of less depth than said transverse groove and forming extensions thereof to constitute a complete marginal groove, a wire frame seated within said groove between the two thicknesses, said panel provided with apertures through said transverse groove exposing the wire frame, covering material extending over both faces of said panel, and a binding secured about the margin of said panel inwardly of said wire frame.

6. The process of forming a panel which comprises the steps of grooving a sheet of thermoplastic material transversely at the middle portion thereof, grooving the sheet on either side of said transverse groove in duplicate opposed relationship, positioning a rigidifying frame in grooves on one side of the transverse groove, folding the other duplicate side about the transverse groove and against the rigidifying frame, and stitching the two sides together to form a double wall panel.

7. The process of forming a double wall panel from a sheet of fiber board which includes the steps of grooving each half of a sheet of fiber board in duplicate opposed relationship, grooving the central portion transversely of the sheet, inserting wire supporting elements into the grooves on one half of the sheet, folding the other half about the transverse groove so that the halves of the sheet lie closely adjacent one another, and fastening the two halves together to form a reinforced double wall panel.

8. The process of forming an intermediate product in the manufacture of double wall panels which includes the steps of stamping a sheet of thermoplastic material with duplicate opposed grooves on either side of the middle portion thereof, and stamping a deeper groove in the middle portion transversely of the sheet.

9. An intermediate product in the manufacture of a double wall panel comprising a substantially rectangular sheet of fiber board, a groove extending around the marginal portion thereof, and a groove of deeper draw extending transversely across the middle portion of the board.

10. In the formation of a panel comprising a sheet of foundation material provided with a layer of covering material secured over one surface thereof, the die cutting of the composite sheet with a die which forms an aperture through the sheet of foundation material only and simultaneously cutting through both the foundation material and the covering material along diagonal lines between the corners of the apertures so formed.

11. In the formation of a panel comprising a sheet of foundation material provided with a layer of covering material secured over one surface thereof, the die cutting of the composite sheet with the die which cuts through the foundation sheet only forming a complete aperture therethrough and simultaneously cutting through both the foundation sheet and the covering sheet diagonally across between the corners of said aperture and removing the severed portions of the foundation material and folding the covering material over the edges of the aperture formed in the foundation material.

12. A panel comprising two complementary leaves of thermoplastic sheet material folded together over a split wire frame having inherent expansive resiliency, said leaves provided with complementary grooves and a common groove along the fold line within which the frame is seated, said frame retained by its inherent resiliency to remain snug in said groove exerting a tension upon the sheets of thermoplastic material and constrained thereby.

HERBERT J. WOODALL.